United States Patent [19]

Benz

[11] 3,923,726
[45] Dec. 2, 1975

[54] PROCESS OF MAKING COLORED HIGH TEMPERATURE POLYMERS

[75] Inventor: Gerhard Benz, Cottage Grove, Minn.

[73] Assignee: Minnesota Mining and Manufacturing Company, St. Paul, Minn.

[22] Filed: June 9, 1969

[21] Appl. No.: 831,751

[52] U.S. Cl. ............ 260/40 R; 260/37 R; 260/37 N; 260/42.56; 260/857 L; 260/857 D; 260/873; 264/176 R
[51] Int. Cl.²... B28B 3/20; C08J 3/22; C08L 67/00; C08L 77/00
[58] Field of Search ............ 260/41, 41.5 MP, 34.2, 260/37 M, 873, 857 L, 857 D, 42.56, 37 R, 37 N, 40 R; 264/176 R

[56] References Cited
UNITED STATES PATENTS

| | | | |
|---|---|---|---|
| 2,512,459 | 6/1950 | Hamilton | 260/28.5 |
| 2,884,663 | 5/1959 | Alles | 264/288 |
| 3,352,952 | 11/1967 | Marr | 264/176 R |
| 3,361,848 | 1/1968 | Siggel et al. | 260/873 |
| 3,375,219 | 3/1968 | Robb | 260/41 R |
| 3,384,693 | 5/1968 | Roe | 264/211 |
| 3,397,169 | 8/1968 | Wilkinson | 260/37 |
| 3,405,198 | 8/1968 | Rein et al. | 260/873 |
| 3,409,585 | 11/1968 | Hagemeyer, Jr. et al. | 260/41 |
| 3,413,249 | 11/1968 | Luftglass et al. | 260/23 |
| 3,433,853 | 3/1969 | Earle et al. | 260/857 L |
| 3,435,093 | 3/1969 | Cope | 260/857 |
| 3,503,922 | 3/1970 | Carton | 260/41 B |
| 3,534,120 | 10/1970 | Ando et al. | 260/873 |
| 3,546,319 | 12/1970 | Prevorsek et al. | 260/857 |
| 3,637,906 | 5/1972 | Parathoen | 260/857 L |

FOREIGN PATENTS OR APPLICATIONS 879,587   10/1961   United Kingdom

OTHER PUBLICATIONS

Renfrew et al., Polythene, (Interscience), (N.Y.) (1960) (2nd ed.), pp. 419–421.
High Polymers Vol. XX, part 2, p. 411 (Interscience, 1964).

Primary Examiner—M. J. Welsh
Assistant Examiner—H. H. Fletcher
Attorney, Agent, or Firm—Alexander, Sell, Steldt & DeLaHunt

[57] ABSTRACT

High melting polymers such as polyester, polyamide or polysulfone are uniformly internally colored by blending therewith a minor amount of easily colored lower-softening thermoplastic additive polymer such as polyethylene, containing an effective amount of coloring material uniformly blended therethrough. High temperature polymers colored in this manner provide shaped articles such as films, fibers, and machine parts having a visually uniform color.

1 Claim, No Drawings

PROCESS OF MAKING COLORED HIGH TEMPERATURE POLYMERS

BACKGROUND OF THE INVENTION

This invention relates to a process of uniformly internally coloring high temperature polymers and the resultant uniformly colored products.

In modern society, there has been a commercial demand for uniformly internally colored shaped articles for such applications as colored dishware, toys, household goods, etc. Uniformly internally colored films, particularly oriented films, have been sought for such applications as overhead projector transparencies, plastic laminates, flexible packaging, electrical insulation, plastic tapes, etc., while uniformly internally colored fibers are greatly desired for clothing and carpeting. External coloration of these items by means of coatings is not satisfactory because the coatings tend to wear away or flake off the article.

While it has been possible to uniformly internally color such thermoplastic polymers as polyethylene and polypropylene, it has been very difficult to internally color thermoplastic polymers which melt at high temperatures or which have a high melt viscosity. This is particularly true if the coloring is done at the time a shaped article is extruded. The several methods known to the art for internally coloring polymers have not been found satisfactory for coloring high melting polymers.

For example, it is generally necessary to use a heated extruder hopper to keep high melting polymers dry. Many coloring agents soften, melt, or decompose at a temperature below the melting point of the high temperature polymer. When dry blended with polymer is a heated extruder hopper, these coloring materials melt before the polymer does, running down the hopper sidewalls to form a "slug" which produces unpredictable and erratic coloring of the polymer. Additionally, when the coloring material melts before the polymer it often wets and lubricates the extruder screw, preventing feeding of the polymer into the extruder. The temperatures necessary to extrude high melting polymers also decompose and ruin many coloring materials. Further, the different particle sizes of polymer and coloring agent tend to cause them to classify and stratify as the mixture flows into the extruder, resulting in uneven coloration.

The technique of dissolving coloring materials in solvent, introducing hot polymer into the solvent to flash it off, and thereafter extruding the color coated polymer has not been found satisfactory for coloring high melting polymers. As with dry blending, the coloring material melts before the polymer does, flows down the hopper walls and forms undesirable color "slugs," or wets the extruder screw and prevents flow of the polymer. The use of heated rubber mills and high shear mixers to blend coloring material into polymer has not been found feasible with high melting polymers, the necessary elevated temperatures decomposing many coloring materials. Further, extensive time-consuming clean-up is necessary between runs of different colors and it is difficult to control the coloring agent concentration with any degree of precision.

Since the requisite amount of coloring material to yield a given color is inversely related to the thickness of the final article, it is impractical to incorporate coloring agent into a high melting polymer during polymerization. Further, this technique necessitates extensive clean-up between each lot, and exposes the coloring material to high temperatures for excessively long periods of time.

In short, a satisfactory method of uniformly coloring high temperature polymers has not been available in the art. Presently available methods are expensive, messy, provide non-uniform coloration, and decompose many coloring materials.

SUMMARY

This invention provides a method of providing high temperature polymers with visually uniform internal coloration. The colored polymers are suitable for extrusion into uniformly colored shaped articles such as dishware, toys, self-supporting films, and fibers. The coloration is accomplished in a manner which prevents colorant "slugs," unpredictable and erratic polymer coloring, extruder screw lubrication, and prolonged exposure of coloring material to high temperatures, thereby preventing decomposition. With the method of this invention it is possible to change from one color to another at will without extensive clean-up between lots. It is also easy to vary the color concentration so as to maintain constant color intensity in articles of various thickness.

In accordance with the invention, high temperature polymers are uniformly internally colored by blending therewith a minor amount of an easily colored lower-softening thermoplastic additive polymer which contains an effective amount of coloring material uniformly blended therethrough.

Polyesters, polyamides, and polysulfones soften and melt at temperatures above about 400°F. and have been found difficult to color uniformly. It has been found that a visibly uniform color may be imparted to these high temperature polymers by first blending the coloring material into an easily colored polymer to form a color concentrate and subsequently blending the colored polymer into the high melting polymer. The coloring materials are first blended with the easily colored additive polymer by any one of the commonly accepted techniques used in the art. For example, the blending can readily be accomplished on a heated rubber mill or high shear blender. Alternatively, if the additive polymer is soluble, the blend can be made by dissolving the polymer and coloring material in solvent and thereafter recovering the colored additive polymer. Also, it is possible to dry blend some polymers and coloring materials, thereafter coextruding them to obtain the colored additive concentrate. Polymers which have been found to be readily colorable and to perform effectively in practicing the invention include high and low density polyethylene, polypropylene, polystyrene, acrylonitrile-butadiene-styrene copolymers, cellulose acetate polymers, and polycarbonate. Suitable additive polymers are those which are capable of being physically mixed with the high-melting polymer without chemically reacting therewith and thereafter extruded from a die to form smooth continuous self-supporting films. These additive polymers may contain any desired effective concentration of coloring material, ranging from a trace amount in relatively thick articles to about 60% by weight in thin articles such as films. A 50% coloring material concentration is economical, easily prepared, and preferred.

Following coloration, the additive polymer is blended with the high temperature polymer to provide a visually uniform color. In some instances it is possible to dry blend the additive polymer with the high temperature polymer and thereafter extrude them together; however, it is preferred to combine them by coextrusion. A preferred method of coextrusion is to "tap" the barrel or feed zone of an extruder for high temperature polymer, attaching a second extruder at this location to permit feeding the colored additive polymer. The two polymers are then rapidly and intimately mixed by the screw of the high temperature extruder to provide a visually uniform color. This method combines the advantages of rapid and intimate mixing in the extruder screw, simplicity, greatly reduced possibility of detrimental interaction between the polymers, and short exposure of the coloring material to high temperatures.

When a colored additive polymer is blended with high temperature polymer by means of "tapping" the barrel of the high temperature extruder, the tap is preferably made at a point which is far enough from the hopper feed zone so that additive polymer is not forced out the extruder hopper. Conversely, the tap must be sufficiently far from the point of discharge from the extruder so that mixing is complete. It has been found that the tap should be made at a distance of about three to about nine, preferably about five, screw diameters in front of the leading edge of the hopper throat. If desired, several taps can be made on one extruder barrel and several additive polymers simultaneously blended into the high temperature polymer.

It has been found that addition of colored additive polymer to a high temperature polymer does not significantly affect its physical properties such as tensile strength, elongation, and break strength, as would normally be expected when a high temperature polymer is adulterated. As much as 20% by weight of additive polymer having a relatively low melting point can be added without significant detrimental effect, a smooth homogeneous blend being obtained. While physical properties begin to decrease when more than about 20% additive polymer is included, it is possible to make polymer blends containing up to about 70% by weight additive polymer. The additive polymer is preferably the minor component and is less than 50% by weight of the final blend. Conversely, the high temperature polymer is preferably the major component and is more than 50% by weight of the blend. If desired, the technique of providing uniform coloration in high temperature polymers, by blending therein a colored additive polymer, can also be utilized with virtually any polymer, regardless of softening or melting point.

The coloring materials which have been found to perform effectively in practicing the invention are virtually unlimited and typically include such organic pigments as phthalocyanine blues and greens; azo reds; quinacridone reds, oranges, scarlets, and violets; alizarin yellows and crimsons; anthraquinone blues, violets, oranges, and yellows. Typical inorganic pigments are such as ultramarine blues, purples, and violets; cadmium reds, yellows and oranges; chromium greens and oxides; iron oxide browns and reds. Typical dyes are solvent, plastic, and oil soluble dyes such as anthraquinone, azo, triarylmethane, azine, xanthene, nitro, nitroso, thiazine, polymethine, oxazine, and acridene. Typical fillers are such as carbon black, titanium dioxide, calcium carbonate, talc, clay, molybdenum disulfide, graphite, etc. The main criterion for selecting a coloring material to be blended into the additive polymer is the stability of the coloring material at the softening or melting temperature of the additive polymer. The particle size of the coloring material should be relatively small so as to provide uniform coloration, less than 10 microns being preferred.

When coloring polymers and shaped articles in accordance with the invention, it is possible to obtain a given color intensity in articles of varying thickness by merely varying the quantity of additive polymer blended into the high temperature polymer. For example, when coextruding, a simple change in screw speed of the additive polymer extruder accomplishes the desired color change. It is also possible to vary color and color intensity by dry blending uncolored additive polymer with colored additive polymer and thereafter combining the blend with high temperature polymer. It is also possible to dry blend any desired number of colored or uncolored additive polymers and subsequently combine the blend with high temperature polymer. Various colors can be blended with each other to provide any desired color and color intensity. It is possible to change from one color to another at will, without timeconsuming clean-up, by feeding a second additive polymer into the extruder, the second polymer purging the first.

The shaped articles colored in accordance with the invention are virtually transparent when the refractive indices of the polymers in the blend are about equal. Blending together polymers of different refractive indices will provide a finished article having a translucent haze. The degree of translucency is directly proportional to the amount of additive polymer in the blend. Shaped articles containing titanium dioxide, carbon black, clay, and other similar colorants are substantially opaque. Further, shaped articles containing a significant amount of inorganic fillers have a matte surface which is readily receptive to marking by pen or pencil.

The following examples, in which all parts are by weight unless otherwise noted, illustrate preparation of the uniformly colored shaped articles of the invention, without limiting the scope thereof.

DESCRIPTION OF PREFERRED EMBODIMENTS

EXAMPLE I

This example illustrates the coloration of a biaxially oriented polyethylene terephthalate film.

Fifty parts of "Pigment Yellow 35" commercially available from Hercules Powder Company under the trade name Golden Cadmium Yellow, X-2283, was combined with 50 parts of high density polyethylene, passed through a 1-inch extruder, and pelletized to provide a uniformly colored additive polymer.

A 2½-inch extruder was tapped by drilling a ⅜ inch diameter hole in the barrel five screw diameters in front of the hopper throat and a 1-inch diameter extruder was piped to feed into the tap. The screw of the 2½-inch extruder was relieved to a depth of one-sixteenth inch for a distance of one-half inch on each side of the tap to reduce the back pressure and permit continuous introduction of additive polymer.

Polyethylene terephthalate was processed through the 2½-inch primary extruder, the colored additive polymer introduced through the 1-inch extruder, the blended polymers cast into a 10-mil film, and the film biaxially oriented 3 X in both the machine and cross directions.

The resultant 0.9 mil film which contained 2% coloring material and 2% polyethylene was uniformly colored and had a 42% light transmission as measured by a haze meter (Gardner Model UX-10A, Gardner Instrument Company), a 27,000 psi tensile strength at an ultimate elongation of 114%.

EXAMPLE II – IV

Example I was repeated, substituting the pigments shown in Table I for the pigment of Example I. Each film was uniformly colored throughout.

TABLE I

| Example | Color |
|---|---|
| 2 | Pigment Red 113 (commercially available from Hercules Powder Company under the trade designation "Mercadium Red Light 2268") |
| 3 | Pigment Orange 23 (commercially available from Hercules Powder Company under the trade designation "Mercadium Deep Orange 2267") |
| 4 | Pigment Blue 29 (commercially available from Hercules Powder Company under the trade designation "Ultramarine Blue 2700") |

EXAMPLES V – VI

The pigments shown in Table II were combined with polyethylene at 25% by weight by the technique used in Examples I – IV. When coextruded with polyethylene terephthalate to form a biaxially oriented film as was done in Examples I – IV. The resultant film was uniformly colored throughout in each instance.

TABLE II

| Example | Color |
|---|---|
| 5 | Pigment Green 7 (commercially available from Hercules Powder Company under the trade designation "Monarch Green 4433") |
| 6 | Pigment Red 48 (commercially available from Hercules Powder Company under the trade designation "Montery Red 2277") |
| 7 | Solvent Red 111 (commercially available from Hercules Powder Company under the trade |

TABLE II-continued

| Example | Color |
|---|---|
| | designation "Monarch Blue 2303") |

EXAMPLES 8–11

The additive polymers shown in Table III were coextruded with polyethylene terephthalate to form a biaxially oriented film as was done in Examples 1–4. The resultant film was uniformly colored throughout in each instance.

TABLE III

| Example | Color |
|---|---|
| 8 | Solvent Red 111 at 3% by weight in polycarbonate (commercially available from the General Electric Company) |
| 9 | Solvent Red 26 at 12.2% by weight in acrylonitrile-butadiene-styrene copolymer (commercially available from the Ashland Chemical Co. under the trade designation cc 4-762) |
| 10 | Calco Oil Green ZKP at 9.25% by weight in polystyrene (commercially available from Ashland Chemical Co. under the trade designation cc 1-3621) |
| 11 | Solvent Yellow 33 at 3% by weight in polycarbonate (commercially available from General Electric Company under the trade designation 416 Amber) |

What is claimed is:

1. A process of forming an oriented film having a visually uniform coloring by coextruding a film consisting essentially of a normally uncolored, relatively high melting, difficulty colorable, thermoplastic polymer selected from the group consisting of polyesters, polysulfones and polyamides with a minor amount of a uniformly colored, lower softening easily colorable thermoplastic additive polymer selected from the group consisting of polyethylene, polypropylene, polystyrene, and acrylonitrile-butadiene-styrene copolymers, whereby the colored additive polymer is uniformly dispersed throughout the difficultly colorable polymer, and thereafter orienting said film.

* * * * *